United States Patent
Schwab

Patent Number: 5,913,909
Date of Patent: Jun. 22, 1999

[54] DEVICE WITH A SELECTION LEVER FOR MOTOR VEHICLE AUTOMATIC TRANSMISSION

[75] Inventor: Dittmar Schwab, Rodgau, Germany

[73] Assignee: Valeo GmbH & Co. Schliessysteme KG, Heiligenhaus, Germany

[21] Appl. No.: 08/881,875

[22] Filed: Jun. 24, 1997

[30] Foreign Application Priority Data

Jun. 28, 1996 [DE] Germany ............ 196 26 013

[51] Int. Cl.⁶ .................................. B60R 25/06
[52] U.S. Cl. .................. 70/247; 70/248; 74/477
[58] Field of Search ............ 70/245–248, 252, 70/254, 279, 475, 477

[56] References Cited

U.S. PATENT DOCUMENTS

| | | | |
|---|---|---|---|
| 4,926,688 | 5/1990 | Murasaki | 70/248 X |
| 4,967,883 | 11/1990 | Kito et al. | 70/248 X |
| 5,003,799 | 4/1991 | Imai et al. | 70/247 |
| 5,150,593 | 9/1992 | Kobayashi et al. | 70/279 X |
| 5,207,124 | 5/1993 | Anderson et al. | 70/248 X |
| 5,218,847 | 6/1993 | Dieden | 70/247 |
| 5,428,977 | 7/1995 | Knape | 70/247 |
| 5,490,585 | 2/1996 | Togano | 70/248 X |
| 5,542,512 | 8/1996 | Maehara | 70/247 X |
| 5,551,266 | 9/1996 | Behrens | 70/247 |
| 5,566,583 | 10/1996 | Suzuki | 70/247 X |
| 5,651,290 | 7/1997 | Osborn et al. | 70/247 X |
| 5,657,654 | 8/1997 | Hoebel | 70/247 |

FOREIGN PATENT DOCUMENTS

| | | | |
|---|---|---|---|
| 0 580 970 | 5/1993 | European Pat. Off. | |
| 3939748 | 10/1990 | Germany | 70/248 |
| 42 06 250 | 9/1992 | Germany | |
| 4206251 | 9/1992 | Germany | 70/247 |
| 41 20 380 | 10/1993 | Germany | |
| 106754 | 4/1989 | Japan | 70/248 |

Primary Examiner—Suzanne Dino Barrett
Attorney, Agent, or Firm—Morgan & Finnegan, LLP

[57] ABSTRACT

A device with a selection lever, which is pivoted about a rotational axis and arranged on a selection lever housing, for motor vehicle automatic transmissions, wherein a barring bolt connected with a lock cylinder is provided for the bolting mechanism of the selection lever. To keep the selection lever housing which rises into the vehicle's interior as small as possible, the barring bolt is disposed underneath the rotational axis of the selection lever. For the bolting mechanism of the selection lever, the barring bolt then engages a groove-shaped recess, of a pivoted catch lever arranged likewise underneath the rotational axis. The catch lever is fixed by the barring bolt and also fixes the selection lever in its bolted setting with a tang. For this, the selection lever is designed as a reversing lever, so that the tang of the catch lever engages the (second) lever part of the selection lever located underneath the rotational axis.

9 Claims, 3 Drawing Sheets

DEVICE WITH A SELECTION LEVER FOR MOTOR VEHICLE AUTOMATIC TRANSMISSION

BACKGROUND OF THE INVENTION

The invention concerns a device with a selection lever, which is pivoted about a rotational axis and arranged on a selection lever housing, for motor vehicle automatic transmissions.

BRIEF SUMMARY OF THE INVENTION

A device with a selection lever arranged pivoted about a rotational axis for motor vehicle automatic transmissions is known from EP 0 580 970 A1, wherein a catch lever connected with a lock cylinder, arranged pivoted relative to the pivot axis of the selection lever, is provided for the selection lever's bolting mechanism. The selection lever has a gated guide in the form of a circular segment attached solidly to it, wherein a tang fastened to the catch lever supports itself and, in the selection lever's bolted setting, engages a recess of the gated guide upon corresponding activation of the lock cylinder.

In this known device, among other things, a relatively large amount of space in the interior of the respective vehicle is needed for the selection lever housing because the gated guide, which is arranged on the selection lever housing and which defines the selection lever's individual settings, is arranged above the selection lever's rotational axis and requires a certain minimum distance from the rotational axis. In particular, these kinds of known devices have therefor proven to be disadvantageous for smaller vehicles with automatic transmission.

A safety device for a motor vehicle which, among other things, is equipped with a transmission containing a selection lever, is known from DE 42 06 250 A1. As a function of the corresponding activation of the cylinder of a lock, the selection lever can be locked by a pawl carrying out a swivelling movement, which, for the cylinder of the lock located outside the key's withdrawal position, supports itself with a stopping surface on a supporting ratchet.

A bolting device between an ignition lock and an automatic transmission's selection lever stored in a housing is known from DE 41 20 380 C2. The seed with a lock cylinder is provided for its bolting mechanism.

The object of the invention is to provide a device of the type mentioned in the introduction, in which the selection lever housing rising up into the motor vehicle's interior is kept as small as possible, and which nevertheless guarantees protection against theft, is constructed simply and sturdily, and works reliably.

This objective is accomplished in accordance with the invention by the characteristics of claim 1. The subclaims will expose additional, particularly advantageous, embodiments of the invention.

The invention is essentially based on the idea of arranging the barring bolt underneath the selection lever's rotational axis. For the bolting mechanism of the selection lever, the barring bolt then engages a groove-shaped recess of a pivoted catch lever arranged likewise underneath the rotational axis. The catch lever is fixed by the barring bolt and also fixes the selection lever in its bolted setting with a tang. For this, the selection lever is designed as a reversing lever, so that the tang of the catch lever engages the (second) lever part located underneath the rotational axis.

It has proven particularly advantageous to arrange a spring-activated peripheral cam on the end of the second lever part. The peripheral cam engages indentations of a gated guide arranged on the selection lever housing. The indentations define the individual settings of the selection lever. In this manner, the gated guide is arranged in the motor vehicle's floor area, and the part of the selection lever housing which reaches into the motor vehicle's interior, can have a substantially smaller height than known selection lever housing.

In order to aim in a simple way for a safety stop, which directly engages the corresponding motor vehicle's engine transmission, in addition to the fixation of the selection lever in the bolted setting, it is proposed in an advantageous further embodiment of the invention, to arrange a tang on the second lever part. Upon sweeping of the selection lever, the tang engages a recess of the first end of a second reversing lever, whose second end is connected with a Bowden cable or a gear of such a type that it engages the safety stop in the engine transmission upon activation of the selection lever.

In an additional example, the selection lever can be arrested in its bolted setting by a locking rod which is slidable along its longitudinal axis. Instead of the handle for pulling the locking rod, which is usually provided here but relatively expensive, a button-like activation element (release button) is provided. A peripheral cam, which, in the selection lever's bolted setting is pressed into a corresponding catch opening of the selection lever housing by a spring, is arranged laterally on the (second) side of the locking rod, the side turned away from the release button. For sweeping of the selection lever, the locking rod must then first of all be pressed downwards against the spring's pressure after activation of a corresponding ignition key, until the peripheral cam is pressed out of the catch opening.

BRIEF DESCRIPTION OF THE DRAWINGS

Additional details and advantages of the invention are given in the examples below, which are explained with the help of figures. These show.

DETAILED DESCRIPTION OF THE INVENTION

Figure 1:
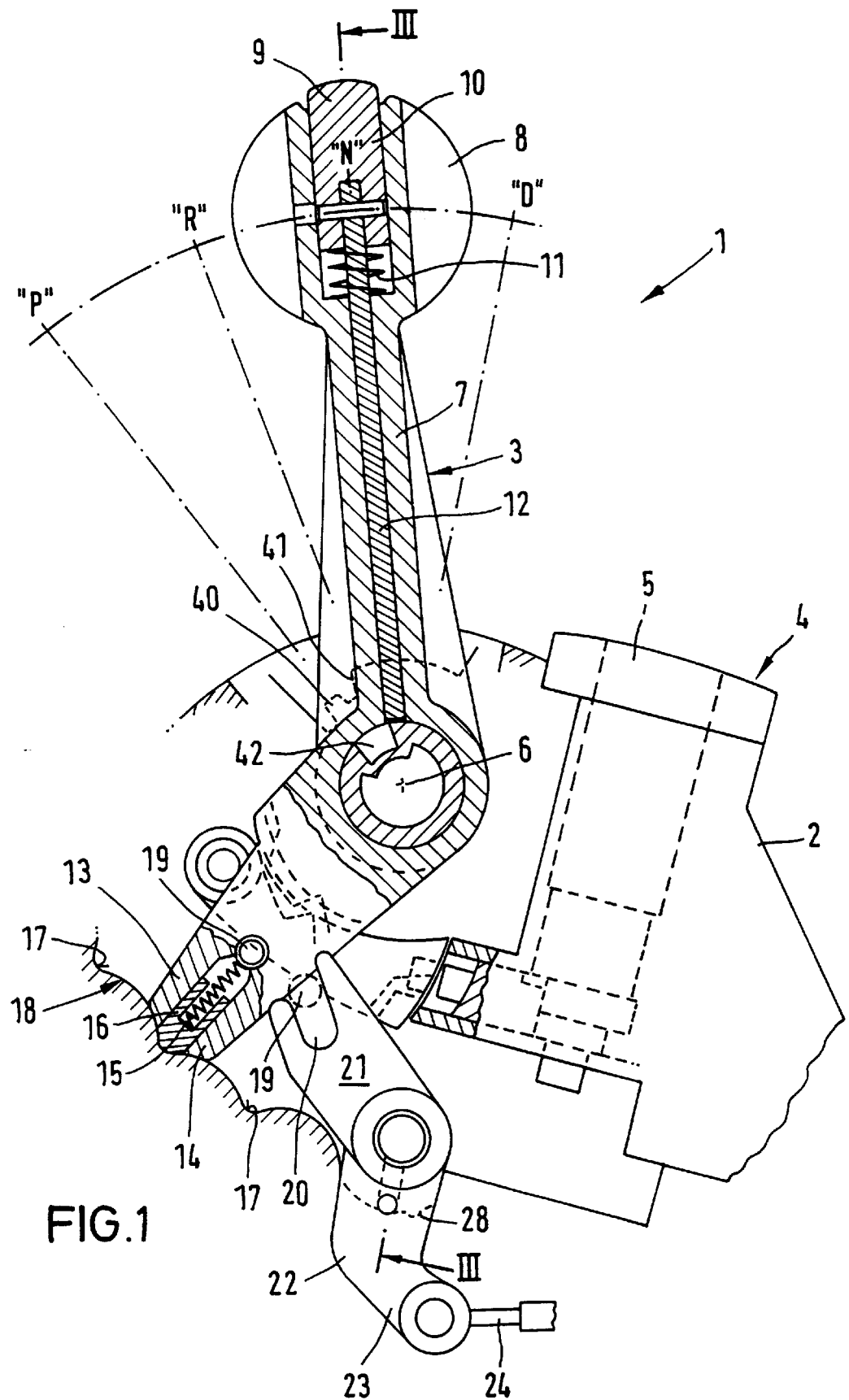
FIG. 1: schematically the side view of a switch gear containing the selection lever mechanism and the ignition lock.

In FIG. 1, a switch gear, which, among other things, includes a selection lever housing 2, a selection lever 3, and an ignition lock 4 with lock cylinder 5, is labeled by a "1". The selection lever 3 is pivoted around a rotational axis 6 and is designed as a reversing lever. A selection lever button 8 is arranged on the upper (first) lever part 7 for improved handling of the selection lever 3. The lever part 7 moreover contains a locking rod 12 which is slidable in the direction of its longitudinal axis 9 by means of a release button 10 against the pressure of a spring 11.

The lower (second) lever part 13 of the reversing lever 3 has a peripheral cam 16 activated by a spring, on its end 14 which is turned away from the rotational axis 6. The peripheral cam 16 engages indentations 17 of a gated guide 18 arranged on the selection lever housing 2. The indentations 17 define the individual selection lever settings ("P", "R", "N", "D").

Furthermore, a tang 19, which engages a recess 20 of the first end 21 of a reversing lever 22 upon activation of the selection lever 3 into the bolted setting (usually the park setting labeled by "P"), is arranged on the second lever part 13. The second end 23 of this reversing lever 22 is connected with a Bowden cable 24 which activates a safety stop, which directly engages the engine transmission of a corresponding vehicle. The safety stop is not illustrated for the sake of clarity.

Figure 3:
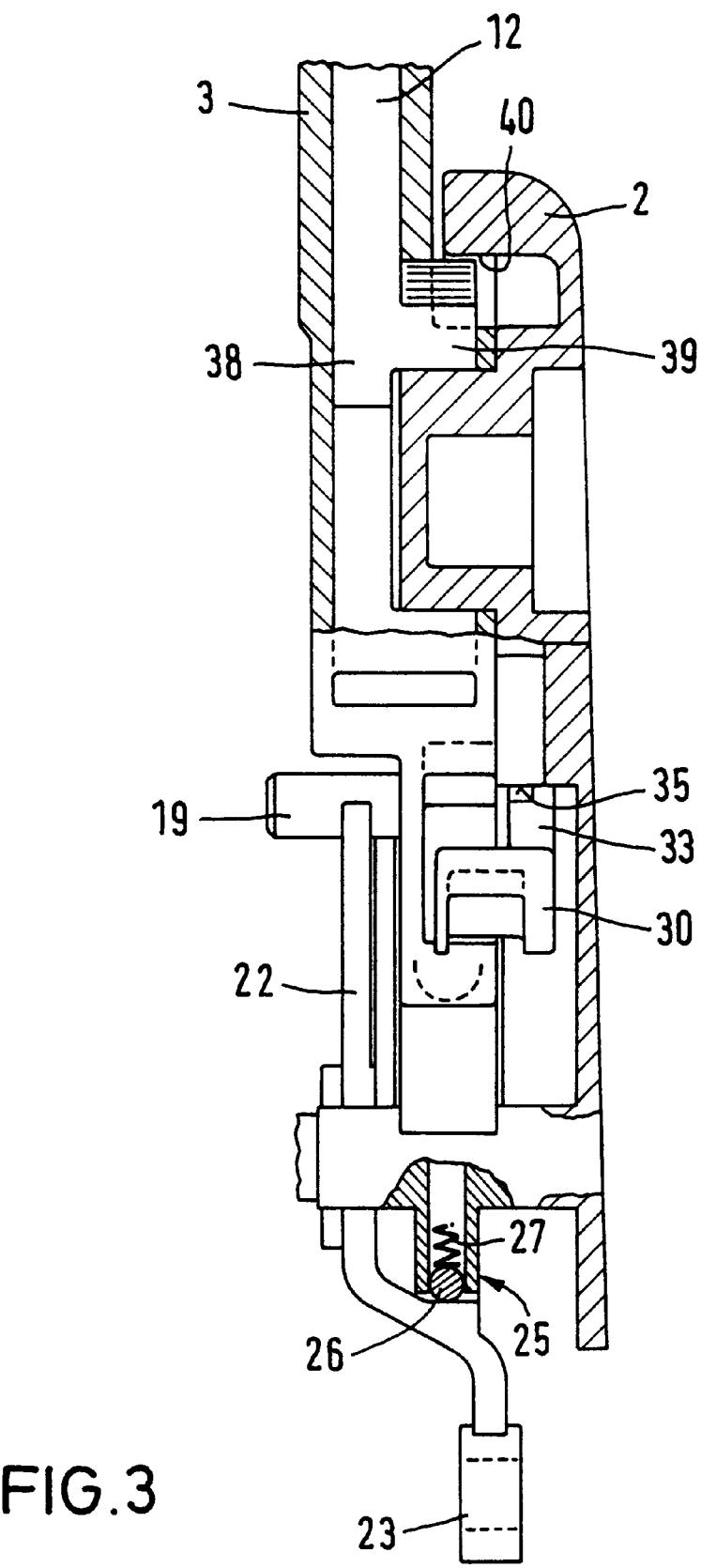
FIG. 3: a cross section along the line labeled III—III in FIG. 1.

In order to prevent changing the initial or final positions of the reversing lever 22 by the force of the Bowden cable 24, a catch element 25 is provided (FIG. 3). The catch element 25 consists of a ball 26 which is pressed into corresponding indentations 28 (FIG. 1) of the reversing lever 22 by a spring 27.

Figure 2:
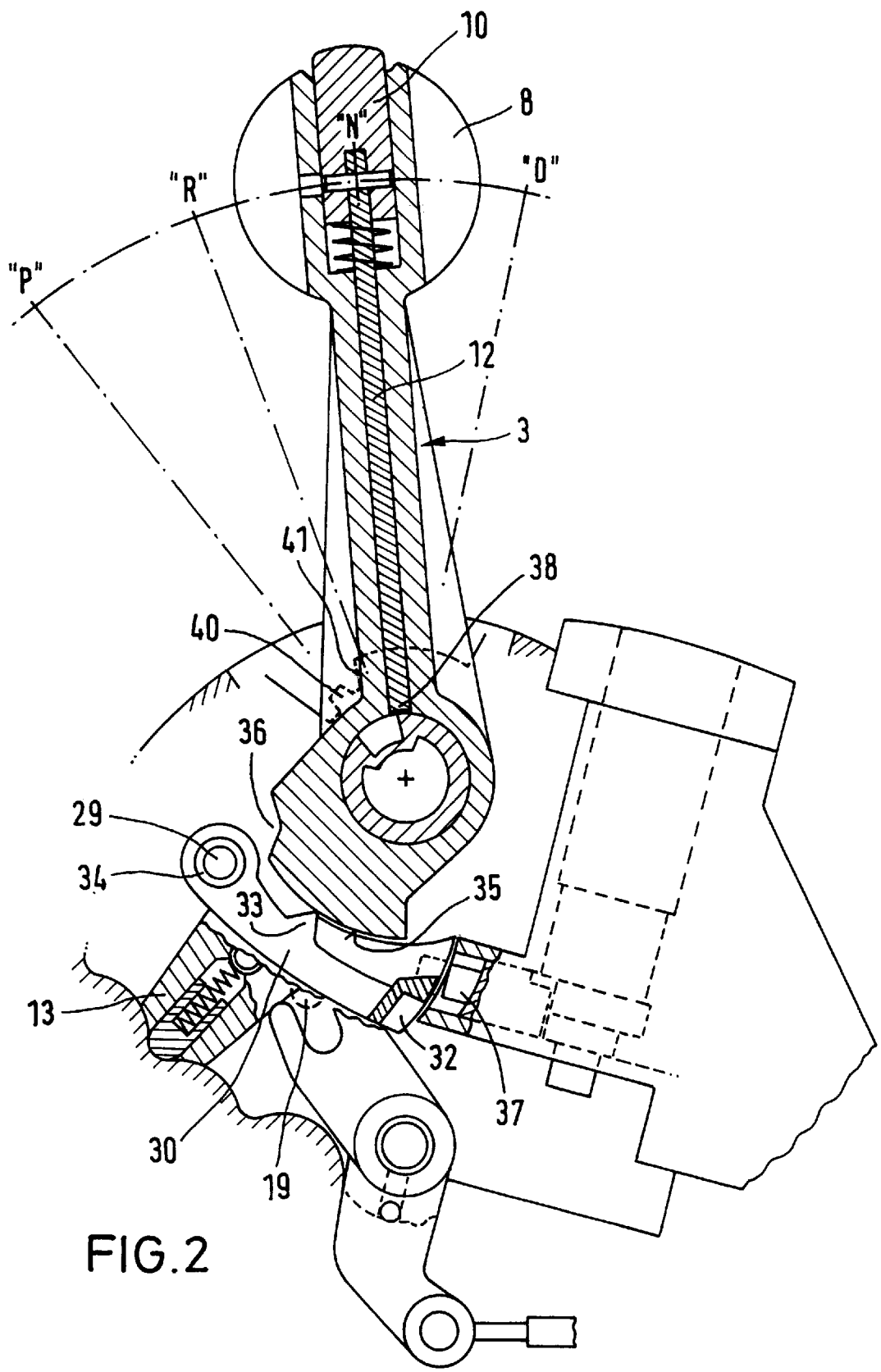
FIG. 2: the side view illustrated in FIG. 1, wherein the selection lever's mechanism and the selection lever's gated guide are illustrated in the plane of the picture for purposes of explanation.

A pivoted catch lever 30 is arranged on the selection lever housing 2 around an axis 29 (FIG. 2). The catch lever's end 31 which is turned away from the axis 29 contains groove-shaped recess 32. A tang 33, which is pressed by a torsion spring 34 against a second gated guide 35 arranged on the second lever part 13 of the selection lever 3, is shaped to the catch lever 30.

The gated guide 35 is designed in such a way that, in the park position "P" of the selection lever, the tang 33 is pressed into a recess 36 of the gated guide 35 by the torsion spring 34. In this position, the groove-shaped recess 32 of the catch lever 30 simultaneously aligns with a slidable barring bolt 37 by turning of the lock cylinder 5.

The selection lever 3 can be arrested in the park position "P" by means of the locking rod 12 which is slidable in the direction of its longitudinal axis 9. For this, a peripheral cam 39 (FIG. 3), which, in the bolted setting of the selection lever 3, is pressed by the spring 11 into a corresponding catch opening 40 (FIG. 1) of the selection lever housing 2, is arranged laterally on the side 38 of the locking rod 12, the side which is turned away from the selection lever button 8. For sweeping of the selection lever 3 after activation of a corresponding ignition key, the locking rod 12 must therefore first be pressed downwards against the pressure of the spring 11 and additionally must be swept over a peg-shaped stop 41 until it is in the reverse setting "R". Then the release button 10 can then be released again.

The mechanism of a device in accordance with the invention is discussed in the following. Let the selection lever 3 first be in the park setting "P" and let the barring bolt 37 be locked into the groove-shaped recess 32 of the catch lever 30 (FIG. 2), so that a sweeping of the selection lever 3 is not possible and the safety stop of the corresponding vehicle remains locked.

If an ignition key fitting into the ignition lock 4 is inserted and turned into the ignition setting, the barring bolt 37 is pulled out of the groove-shaped recess 32 of the catch lever 30. By a pressing of the release button 10, the locking rod 12 is pressed downwards into a recess 42 (FIG. 1). Simultaneously, the laterally shaped peripheral cam 39 (FIG. 3), which keeps the selection lever 3 arrested in the setting "P", is pressed out of the catch opening 40 of the selection lever housing 2, the selection lever 3 is swept into the setting "R", and the release button 10 is again released. Now the selection lever 3 can be swept into the desired drive setting, whereby the tang 33 sweeps the catch lever 30 downwards through the gated guide 35. The groove-shaped recess 32 and the locking rod 37 no longer align with one another, so that the selection lever 3 cannot be locked by the barring bolt 37.

Conversely, if the motor vehicle is to be secured against theft, the selection lever 3 will first of all be swept so long, until the locking rod 12 hits against the stop 41 (FIG. 1). The arrest of the selection lever 3 occurs from pressing of the release button 10, farther sweeping of the selection lever 3 into the park setting, and release of the button 10. Then the ignition key can be turned into its initial setting and pulled out. In this case, the barring bolt 37 slides into the groove-shaped recess 32 of the catch lever 30, since even the catch lever 30 is swept back into its initial position when the selection lever 3 sweeps back. The selection lever is locked.

REFERENCE LIST 1 switch gear
2 selection lever housing
3 selection lever, reversing lever
4 ignition lock
5 lock cylinder
6 rotational axis
7 first lever part
8 selection lever button
9 longitudinal axis
10 button shaped activation element, release button
11 spring
12 locking rod
13 second lever part
14 end
15 spring
16 peripheral cam
17 indentations
18 gated guide
19 tang
20 recess
21 first end
22 reversing lever
23 second end
24 Bowden cable
25 catch element
26 ball
27 spring
28 indentation
29 axis
30 catch lever
31 end
32 groove-shaped recess
33 second tang
34 torsion spring
35 gated guide
36 recess (for the gated guide)
37 barring bolt
38 side (locking rod)
39 peripheral cam
40 catch opening
41 stop
42 recess

I claim:
1. A device for a motor vehicle automatic transmission comprising:
   a) a selection lever pivotable about a rotational axis and disposed on a selection lever housing, said selection lever having a bolting mechanism;
   b) a barring bolt connected with a lock cylinder cooperating with the bolting mechanism of said selection lever, wherein said barring bolt is engageable when said selection lever is bolted;
   c) a spring-loaded pivoted catch lever disposed on the selection lever housing, said catch lever having a sweepable end, and having a groove-shaped recess on the sweepable end;

d) a second lever part disposed on the selection lever underneath the rotational axis and having a gated guide;

e) a tang supported on said catch lever, said tang being pressed into a recess of said gated guide by a spring on the tang;

wherein when the selection lever is bolted, said groove-shaped recess of said catch lever aligns with said barring bolt, so that said barring bolt is pressed into said recess upon corresponding activation of said lock cylinder.

2. A device as recited in claim 1, wherein a spring-activated peripheral cam is disposed on an end turned away from said rotational axis of said second lever part, said peripheral cam engaging a plurality of indentations of a second gated guide disposed on said selection lever housing, wherein the indentations define a plurality of individual settings of said selection lever.

3. A device as recited in claim 1, further comprising a second tang disposed on said second lever part for engaging a recess of a first end of a reversing lever when said selection lever is bolted, wherein a second end of said reversing lever is connected with a Bowden coil or a gear, such that a safety stop engages the transmission of the vehicle upon activation of said selection lever.

4. A device as recited in claim 3, further comprising a catch element adapted to define the initial and final positions of said reversing lever, said catch element having a spring-activated ball, said ball adapted to be pressed into a plurality of indentations of said reversing lever.

5. A device as recited in claim 1, wherein said selecting lever is bolted by a locking rod slidable along a longitudinal axis of the locking rod, wherein a locking cam is arranged laterally on a side of said locking rod turned away from a selection lever button, said locking cam engaging a corresponding stop opening when said selection lever is bolted, and wherein said locking rod is adapted to release the arresting of said selection lever when pressed downwards against the pressure of a spring.

6. A device as recited in claim 2, further comprising a second tang disposed on said second lever part for engaging a recess of a first end of a reversing lever upon activation of said selection lever in the bolted setting, wherein a second end of said reversing lever is connected with a Bowden coil or a gear, such that a safety stop engages the transmission of the vehicle upon activation of said selection lever.

7. A device as recited in claim 2, wherein said selecting lever is bolted by a locking rod slidable along a longitudinal axis of the locking rod, wherein a locking cam is arranged laterally on a side of said locking rod turned away from a selection lever button, said locking cam engaging a corresponding stop opening when said selection lever is bolted, and wherein said locking rod is adapted to release the arresting of said selection lever when pressed downwards against the pressure of a spring.

8. A device as recited in claim 3, wherein said selecting lever is bolted by a locking rod slidable along a longitudinal axis of the locking rod, wherein a locking cam is arranged laterally on a side of said locking rod turned away from a selection lever button, said locking cam engaging a corresponding stop opening when said selection lever is bolted, and wherein said locking rod is adapted to release the arresting of said selection lever when pressed downwards against the pressure of a spring.

9. A device as recited in claim 4, wherein said selecting lever is bolted by a locking rod slidable along a longitudinal axis of the locking rod, wherein a locking cam is arranged laterally on a side of said locking rod turned away from a selection lever button, said locking cam engaging a corresponding stop opening when said selection lever is bolted, and wherein said locking rod is adapted to release the arresting of said selection lever when pressed downwards against the pressure of a spring.

\* \* \* \* \*